(12) United States Patent
Helasuo et al.

(10) Patent No.: US 6,776,083 B2
(45) Date of Patent: Aug. 17, 2004

(54) MEMBRANE ACTUATOR

(75) Inventors: Jarmo Helasuo, Espoo (FI); Esko Yli-Koski, Kerava (FI)

(73) Assignee: Metso Automation Oy, Helsinki (FI)

( * ) Notice: Subject to any disclaimer, the term of this patent is extended or adjusted under 35 U.S.C. 154(b) by 23 days.

(21) Appl. No.: 10/148,692

(22) PCT Filed: Nov. 29, 2000

(86) PCT No.: PCT/FI00/01039

§ 371 (c)(1),
(2), (4) Date: May 31, 2002

(87) PCT Pub. No.: WO01/40663

PCT Pub. Date: Jun. 7, 2001

(65) Prior Publication Data

US 2003/0000381 A1 Jan. 2, 2003

(30) Foreign Application Priority Data

Dec. 3, 1999 (FI) ............................................. 19992608

(51) Int. Cl.$^7$ ................................................. F01B 9/04
(52) U.S. Cl. ....................................................... 92/136
(58) Field of Search .......................................... 92/136

(56) References Cited

U.S. PATENT DOCUMENTS

| | | | | |
|---|---|---|---|---|
| 2,251,240 A | * | 7/1941 | Kellogg ........................ | 92/136 |
| 3,011,483 A | * | 12/1961 | Frick et al. .................... | 92/136 |
| 4,299,302 A | * | 11/1981 | Nishikawa et al. ........... | 92/136 |
| 4,392,631 A | * | 7/1983 | DeWald ........................ | 92/136 |
| 4,610,411 A | | 9/1986 | Veaux et al. .................. | 92/136 |
| 4,794,847 A | | 1/1989 | Kreuter et al. ................ | 92/136 |
| 5,024,116 A | * | 6/1991 | Kraft ............................ | 92/136 |
| 5,477,642 A | | 12/1995 | Legendre ..................... | 92/136 |
| 5,560,282 A | | 10/1996 | Trenner et al. ............... | 92/136 |

FOREIGN PATENT DOCUMENTS

| | | |
|---|---|---|
| DE | 2 920 236 | 11/1980 |
| EP | 0 047 613 | 3/1982 |
| FR | 2 250 058 | 5/1975 |
| GB | 2 047 344 | 11/1980 |
| RU | 2 097 608 | 11/1997 |

* cited by examiner

Primary Examiner—F. Daniel Lopez
(74) Attorney, Agent, or Firm—Pillsbury Winthrop LLP

(57) ABSTRACT

The present invention relates to a diaphragm actuator for control valves, wherein the gear rack is arranged so that the points of contact of the gear rack/gear wheel system are situated on the straight line connecting the centers of the movable walls of the pressure spaces effecting the movement. Thereby, no torsion forces act on the diaphragm backing plates or on the diaphragms, but the forces effecting the movement of the reciprocating elements are substantially parallel with the path of motion and symmetrical. Additionally, the clearance between the gear rack and the gear wheel is substantially eliminated by means of a support roll with bearings. According to the invention, a lightly movable actuator is provided, in which the delays caused by clearances or wall friction of the cylinder-piston arrangement are substantially eliminated. The actuator can be implemented either as double-acting or single-acting.

3 Claims, 2 Drawing Sheets

MEMBRANE ACTUATOR

This application is the National Phase of International Application PCT/FI00/01039 filed Nov. 29, 2000 which designated the U.S.

FIELD OF THE INVENTION

The present invention relates to rotary valves controlled by actuators. Particularly, the invention relates to actuators designed for control valves.

BACKGROUND OF THE INVENTION

Quarter-turn valves generally applied in the industry are often operated by means of pneumatic actuators. The actuators can be either single-acting or double-acting, whereby with the single-acting devices, movement in the opposite direction is effected by a spring, compressed air working against the spring.

In a double-acting pneumatic actuator, both directions of operation are actuated by compressed air. In that case, sealing must be arranged for two pneumatic pistons, or pistons and piston rods, which causes considerable friction. In shut-off operation the friction causes no great disadvantage, but when using the valve for control, the difference between the static friction and the dynamic friction of the elements of the device must be as small as possible, and the friction must be as low as possible.

High initial-stage friction during movement causes an output surge, in this case a shaft overreaction, when gas is used as pressurized medium. If the difference between the static friction and the dynamic friction is large, movement does not start before the moment caused by the pressure difference exceeds the static friction force and the opposing moment caused by the load. When the elements start moving, the movement continues until the opposing forces due to the pressure difference and to the dynamic friction (which is lower than the static friction) plus the load, are equal.

In a surge situation, small position changes easily cause position overshoot and a corrective motion. Depending on the control gain, oscillation around the required position may also arise in this situation.

In patent publication U.S. Pat. No. 4,610,411, a double-acting actuator for changing reciprocal linear motion into rotational motion is disclosed, said actuator comprising a gear rack in contact with a gear wheel, the gear contact line being concurrent with the line running through the piston centers. The device is an actuator designed for the directing wheels of a landing gear of an airplane, using a piston system sealed with elastic rings and providing, with a special arrangement, a longer travel when required. The construction is rigid and involves considerable friction.

gear wheel, the gear contact line being concurrent with the line running through the piston centers. The device is an actuator designed for the directing wheels of a landing gear of an aeroplane, using a piston system sealed with elastic rings and providing, with a special arrangement, a longer travel when required. The construction is rigid and involves considerable friction.

Attempts have been made to solve friction problems caused by piston-cylinder arrangements by means of diaphragm designs. In U.S. Pat. No. 5,477,642, a double-acting diaphragm actuator designed for automobiles is disclosed, wherein the diameters of pistons are smaller than those of the cylinders, and to the pistons and the walls of the cylinders are fitted diaphragms that provide sealing and flex for the length of the piston travel. Between the pistons there is a gear rack actuating a geared shaft end located in the space between the cylinders. When the actuator performs the transversal motion, this motion can be transmitted to the shaft as such, or converted to rotational movement.

In Russian patent 2097608, a similar double-acting diaphragm actuator is disclosed. Common for these is the feature that the point of contact of the geared shaft end and the gear rack connecting the pistons is located to the side of the line connecting the axis of the pistons. Thus, the push force exerted on the gear rack from the direction of either of the pistons also effects a side thrust tending to move the pistons away from their symmetrical position on the path of movement. Additionally, the non-toothed back of the rack, directed away from the shaft end, is supported against the housing of the actuator, sliding against it, which causes considerable friction.

In U.S. Pat. No. 4,794,847, a single-acting diaphragm actuator is disclosed, in which a gear rack connected to a piston acts on a geared shaft end. A support wheel for the gear rack is provided on the smooth side of the rack. This wheel is required particularly because the spring of the single-diaphragm actuator affects the gear rack asymmetrically. Because the centering of the gear rack must be accomplished with a support wheel, also this design produces friction and the device is not suitable for accurate control applications.

U.S. Pat. No. 5,560,282, DE patent application 2920236 and EP patent application 47 613 also describe actuators provided with sliding pistons.

Disclosure of the Invention

A diaphragm actuator as described in claim 1 has now been invented, said actuator being characterized in that the gear rack is arranged so that the points of contact between the gear rack and the gear wheel are located substantially on the straight line connecting the centers of the movable walls of the pressure spaces that effect the motion. Therefore, no torsion forces act on the backing plates of the diaphragms or the diaphragms themselves, but the forces effecting the motion of the reciprocating elements are substantially parallel with the path of motion, and symmetrical.

In addition, it is essential to the invention that the clearance between the gear rack and the gear wheel has been substantially eliminated by means of a support roll with bearings, said roll being arranged to act at the point of contact of the gear, on the back of the gear rack.

According to the present invention, an lightly moving actuator is provided, where delay effects caused by clearances or by wall friction within the cylinder-piston system are substantially eliminated. The actuator can be implemented either as double-acting, whereby pressurized spaces work in opposite directions, or as single-acting, whereby the pressurized spaces at both ends of the gear rack work in the same direction, and return is effected by a spring. In case of a single-acting device, one end of the gear rack requires a sealed through-hole, but as the force moving the gear rack is strong due to the double piston area, the friction of the bushing has no great significance for the mobility.

DETAILED DESCRIPTION OF THE INVENTION

Figure 1:
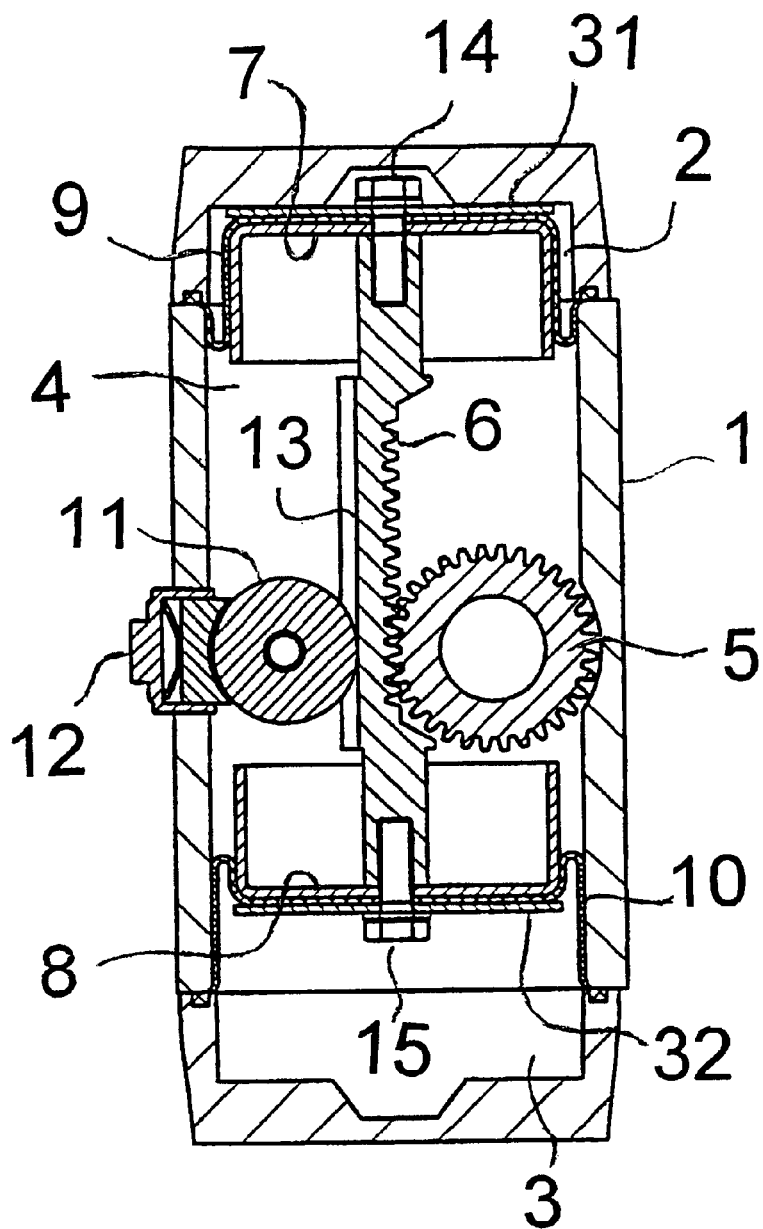
FIG. 1 shows a double-acting actuator in accordance with the present invention.

The invention will now be described in more detail in the following, with reference to the enclosed drawings. FIG. 1 shows a section of an actuator in a plane perpendicular to the shaft to be controlled. The actuator comprises housing 1 comprising spaces capable of being pressurized (hereinafter, pressure spaces) 2 and 3, and a pressureless central space 4. Fitted to one end of the driving shaft adapted to the center space 4 there is a gear wheel 5. The gear wheel is in close involute mesh with a gear rack 6. The gear rack 6 is at its both ends attached to cup-shaped diaphragm backing plates 7 and 8. These, together with inner plates 31 and 32, support diaphragms 9 and 10 which form walls of the pressure spaces 2 and 3. For instance, when space 2 is being pressurized, the pressure acts uniformly on diaphragm 9 which, when folding into the gap between housing 1 and backing plate 7 of the diaphragm, effectively centers the backing plate 7 to its path of motion, which is parallel with the gear rack 6. The line of contact between the gear rack 6 and the gear wheel 5 is substantially concurrent with the straight line connecting the centers of the diaphragm backing plates 7 and 8, whereby no torsion forces act on the diaphragm backing plates. An essential element of the invention is the support roll 11 adapted to act on the back of the gear rack at the point of contact of the gear rack and the gear wheel. The support roll 11 carries the load of the transverse component of the mesh force caused by the gear contact. By using an adjustment mechanism 12 for forcing roll 11 against the gear rack, the clearance between the gear rack and the gear wheel can be substantially eliminated. Thus, it is particularly advantageous to use an actuator of the present invention, e.g., for control where all clearances add dead time to the process. Preferably, a roller bearing can be used as a support roll, and further the support roll preferably runs in a groove 13 provided in the gear rack according to the periphery of the roll, the roll positioning the gear rack 6, backing plates 7, 8 of the diaphragm and the diaphragms 9, 10 concentrically with respect to the central line of the pressure spaces 2 and 3 in direction of the axle of the gear wheel 5, when the pressure spaces 2 and 3 are not pressurized.

Because the actuator, due to the diaphragm arrangement, has no static friction characteristic of pneumatic cylinder-piston designs, motion of the gear wheel 5 can be achieved with a very low pressure difference between the pressure spaces 2,3. The travel can be adjusted in a known manner using screws 14 and 15.

Figure 2:
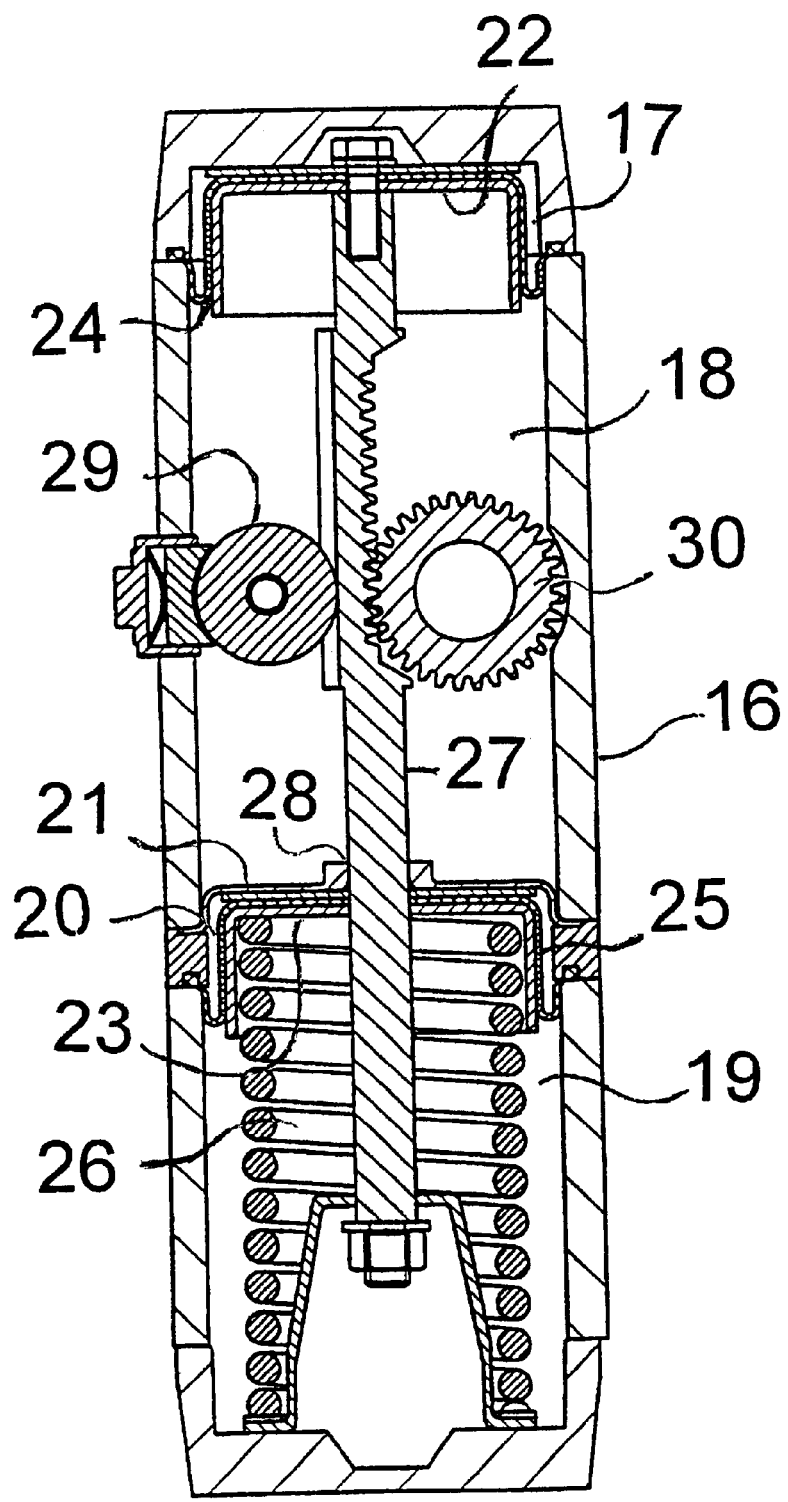
FIG. 2 shows a single-acting actuator with spring return, in accordance with the present invention.

FIG. 2 shows a single-acting actuator in accordance with the invention, said actuator comprising housing 16, pressure space 17, pressureless center space 18 and pressureless spring space 19. Another pressure space 20 is provided between spring space 19 and the center space by means of a separating wall, and the pressure spaces comprise movable, cup-shaped diaphragm backing plates 22 and 23, and diaphragms 24 and 25 with inner plates like in the double-acting application. In the figure, neither of the pressure spaces is pressurized, and the movable elements of the device are in a position determined by the spring 26. One end of the gear rack 27 extends through the separation wall 21 with a sealed lead-through 28, and is connected to the diaphragm backing plate 23. The actuator further comprises a gear wheel 30 and an adjustable supporting roll 29 like in the double-acting application.

When the pressure spaces 17 and 20 are simultaneously pressurized, a uniform force is achieved, acting against the spring force, substantially parallel with the line of contact of the gear. Friction caused by the small lead-through 28 of the cylindrical end of the gear rack is low compared with the force moving the gear rack, caused by the pressure acting on both of the backing plates.

The force effected by the parallel diaphragms 24 and 25 of the pressure spaces 17 and 20, less the force of the spring 26, effects a force of the same magnitude as in the double-acting design, which enables modularity of the single-acting and the double-acting actuators.

What is claimed is:

1. An actuator for rotational motion of a shaft, said actuator comprising a gear rack arranged in contact with a gear wheel, whereby a backing plate of a respective diaphragm is connected to each end of the gear rack, which together with the flexible diaphragms form movable walls of two spaces capable of pressurization, wherein the line of contact of the gear is substantially concurrent with the straight line going through the centers of said movable walls, and the gear rack is adjustably pressed against the gear wheel by means of a support roll with bearings, wherein the support roll runs in a groove provided in the gear rack.

2. An actuator in accordance with claim 1, wherein the movable walls of the spaces to be pressurized are adapted to work in opposing directions of movement of the gear rack.

3. An actuator in accordance with claim 1, wherein the support roll is provided with roller bearings.

* * * * *